United States Patent
Dedrich et al.

(10) Patent No.: US 6,748,638 B2
(45) Date of Patent: Jun. 15, 2004

(54) APPARATUS AND METHOD FOR LOCATING A VEHICLE WINDOW PANEL

(75) Inventors: Paul M. Dedrich, Grand Blanc, MI (US); Casimir R. Kiczek, Livonia, MI (US); Michael G. Linihan, Royal Oak, MI (US); William T. Dufour, Macomb Twp., MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 10/122,596

(22) Filed: Apr. 15, 2002

(65) Prior Publication Data

US 2003/0192256 A1 Oct. 16, 2003

(51) Int. Cl.$^7$ ................................................ B25B 27/14
(52) U.S. Cl. ..................... 29/281.6; 29/703; 29/714; 29/281.1; 49/227; 49/375
(58) Field of Search ..................... 29/703, 714, 468, 29/701, 702, 281.6, 407, 434, 464, 466; 49/348, 349, 350, 351, 352, 353, 227, 375; 403/4

(56) References Cited

U.S. PATENT DOCUMENTS

| | | | | |
|---|---|---|---|---|
| 4,026,088 A | * | 5/1977 | Akabane | 52/716.5 |
| 4,608,779 A | * | 9/1986 | Maeda et al. | 49/374 |
| 4,811,519 A | * | 3/1989 | Gold | 49/375 |
| 6,330,764 B1 | * | 12/2001 | Klosterman | 49/375 |

* cited by examiner

Primary Examiner—Joseph J. Hail, III
Assistant Examiner—Daniel Shanley
(74) Attorney, Agent, or Firm—Casimir R. Kiczek

(57) ABSTRACT

A window alignment device for use in a door having a recess and a peripheral edge and a window regulator is provided. A window panel is adjacent to the window regulator. The panel has a peripheral edge and a portion adapted to conform to the shape of the door and disposed in the recess of the door. Additionally, a locator member is adjacent to the peripheral edge; the locator member is disposed between the door and the window panel. When the panel is fixedly fastened to the regulator, the locator member is removed to form a predetermined gap between the edge of the window panel and the corresponding seal in the door or the body.

20 Claims, 5 Drawing Sheets

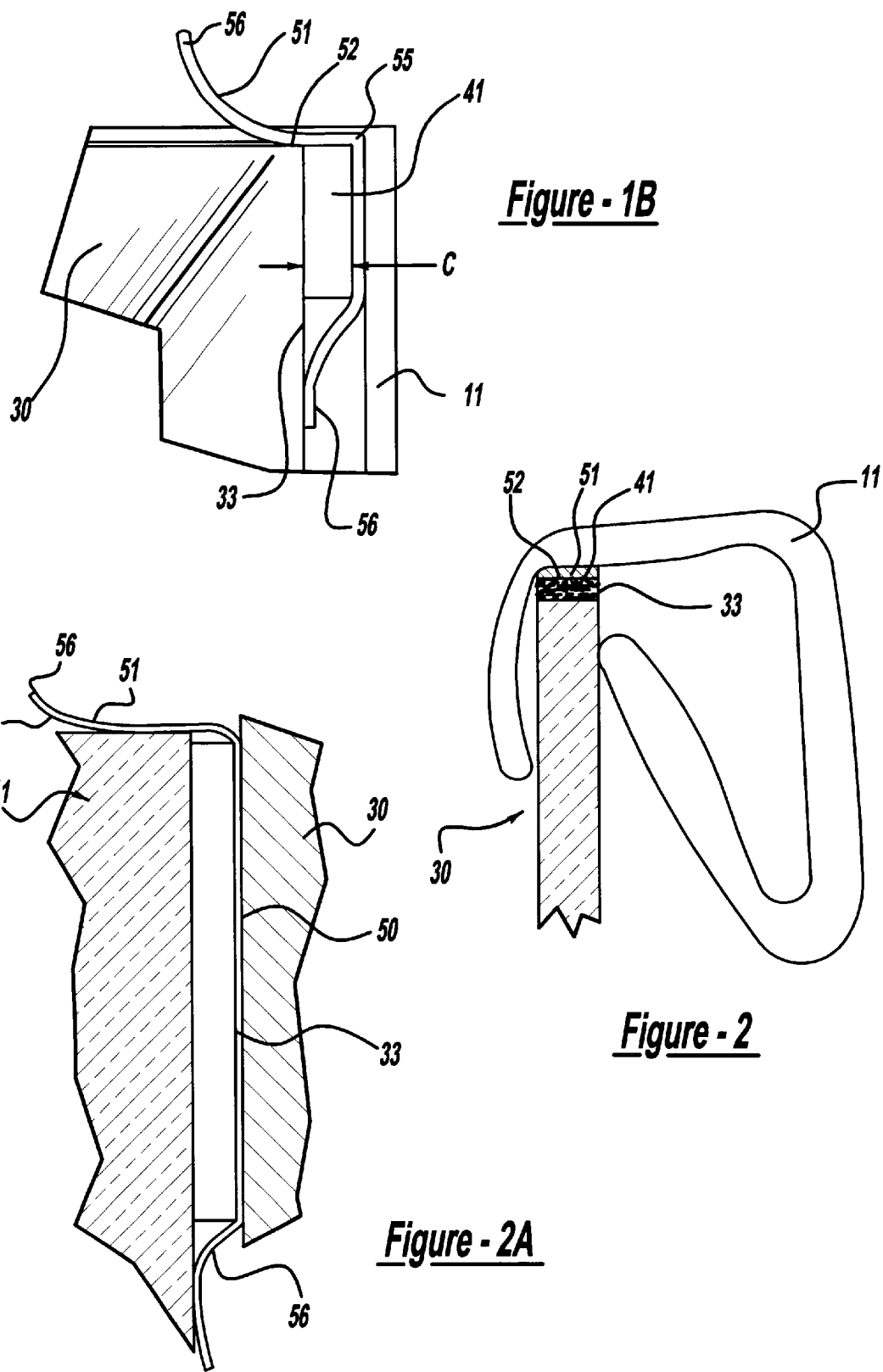

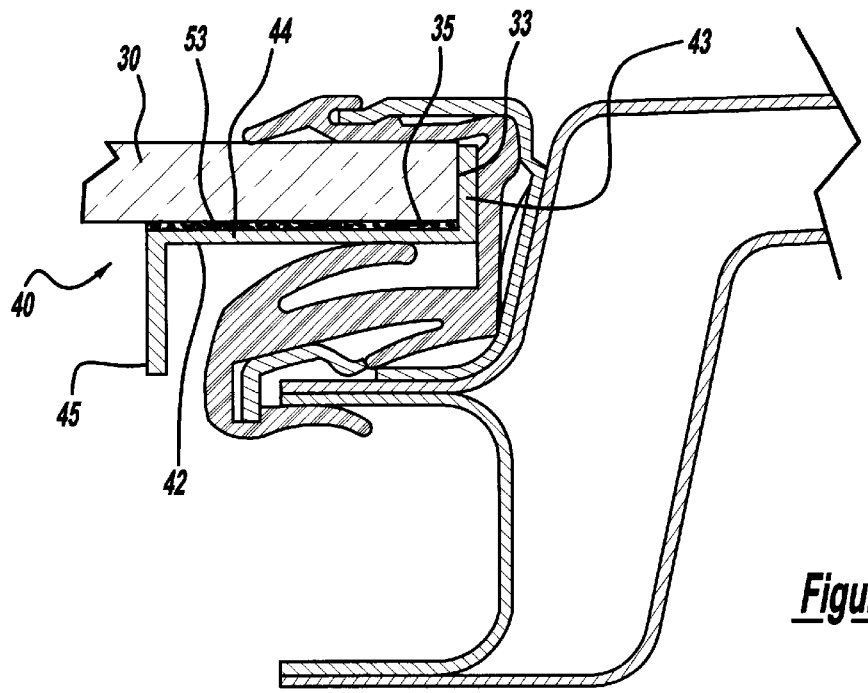
*Figure - 5*
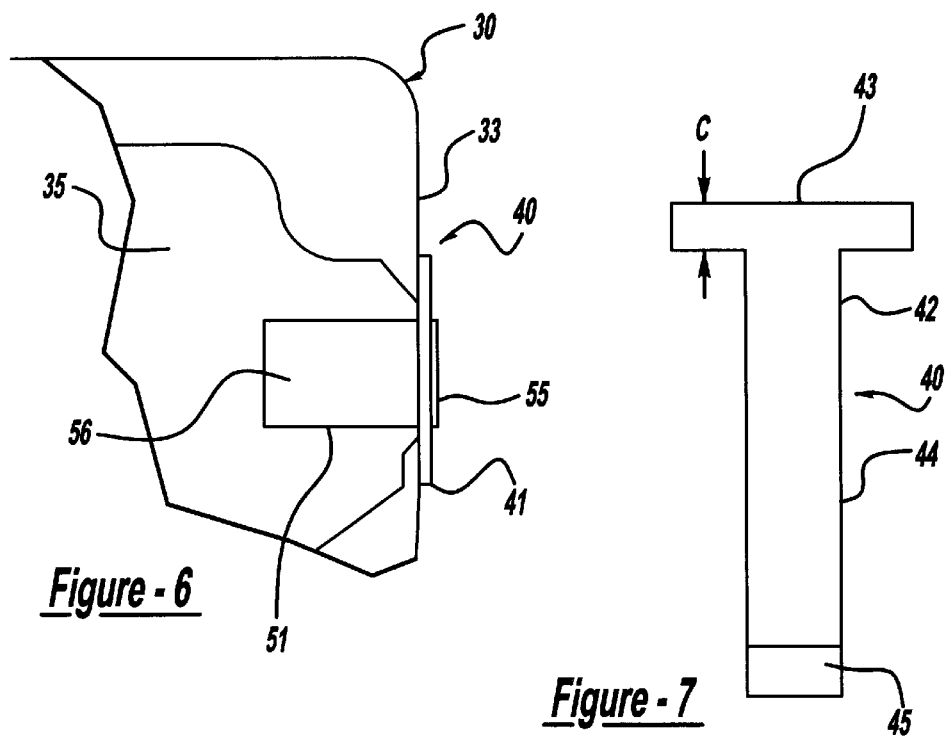
*Figure - 6*
*Figure - 7*

APPARATUS AND METHOD FOR LOCATING A VEHICLE WINDOW PANEL

BACKGROUND AND SUMMARY OF THE INVENTION

The present invention relates to vehicular windowpanes and more specifically to an apparatus and method for setting a gap between a windowpanel and its corresponding seal.

In vehicular doors, the window and regulators all mounted in the door. The windowpane is firmly and fixedly retained by the door window and regulator assembly to permit the window to be raised and lowered. Glass panes must be accurately positioned within the window frame so that the gap between the edge of the pane and window frame or in frameless designs with the door is uniform along the entire periphery of the glass pane.

Conventionally, the glass panel would be adjusted to fit the seals around the window opening by trial and error. With the door closed, the assembly line worker or individual responsible for the fit of the window panel to the seals determines if the glass panel should be moved to provide proper seal engagement and he must estimate the adjustment necessary to properly meet the seals. The individual then opens the door, makes the estimated adjustment, and then closes the door to determine if the adjustment was proper. If the adjustment is not correct, this procedure must be repeated. Often, because of the lack of time or patience, the optimum fit of the window panel to seals is not achieved resulting in poor fits, wind noise and water leakage problems.

Several devices have been developed to set the door glass panel relative to the vehicle door or seal. For example, U.S. Pat. Nos. 4,051,632; 4,183,178 and 5,829,123. However, these devices are primarily designed to prevent panel tilting relative to the plane of the opening in the door. The devices prescribe a fixed location of the panel relative to the seal in spite of numerous to clearance variations in the assembly. Furthermore, with these devices it is difficult to determine if the proper gap or clearance is set between the edge of the door glass and vehicle door and or seal. If this gap is not within the prescribed limits may increase seal drag and electric motor current draw. Thus, a method and apparatus is needed to positively preset a clearance between the edge of the door glass and the vehicle body and seal that is inexpensive, and easy to use.

The present invention provides a vehicle window assembly device adapted for use in a door having a peripheral edge, a recess, and a window regulator. The device includes a window panel adjacent to the window regulator, the panel having an edge and a portion of the shape of the door disposed in the recess of the door. Additionally, a locator member is adjacent to the peripheral edge. The locator member further being disposed between the door and the window panel. Whereby when the window panel is fastened to the regulator, the locator member is removed to form a predetermined gap between the window panel and the door.

BRIEF DESCRIPTION OF THE DRAWINGS

FIG. 1B is a partial side elevational view of the locator block shown affixed to the edge of the window pane in relation to a run channel in the vehicle;

FIG. 2 is a partial top elevational view of the locator block on the edge of the windowpane in relation to a run channel in the vehicle;

FIG. 2A is a partial side view of the locator block shown affixed to the run channel in the vehicle;

FIG. 5 is a partial blown up top sectional view of another embodiment of the invention;

FIG. 6 is a partial perspective cut-away view of the another embodiment;

FIG. 7 is a top elevational view of the another embodiment;

Figure 1:
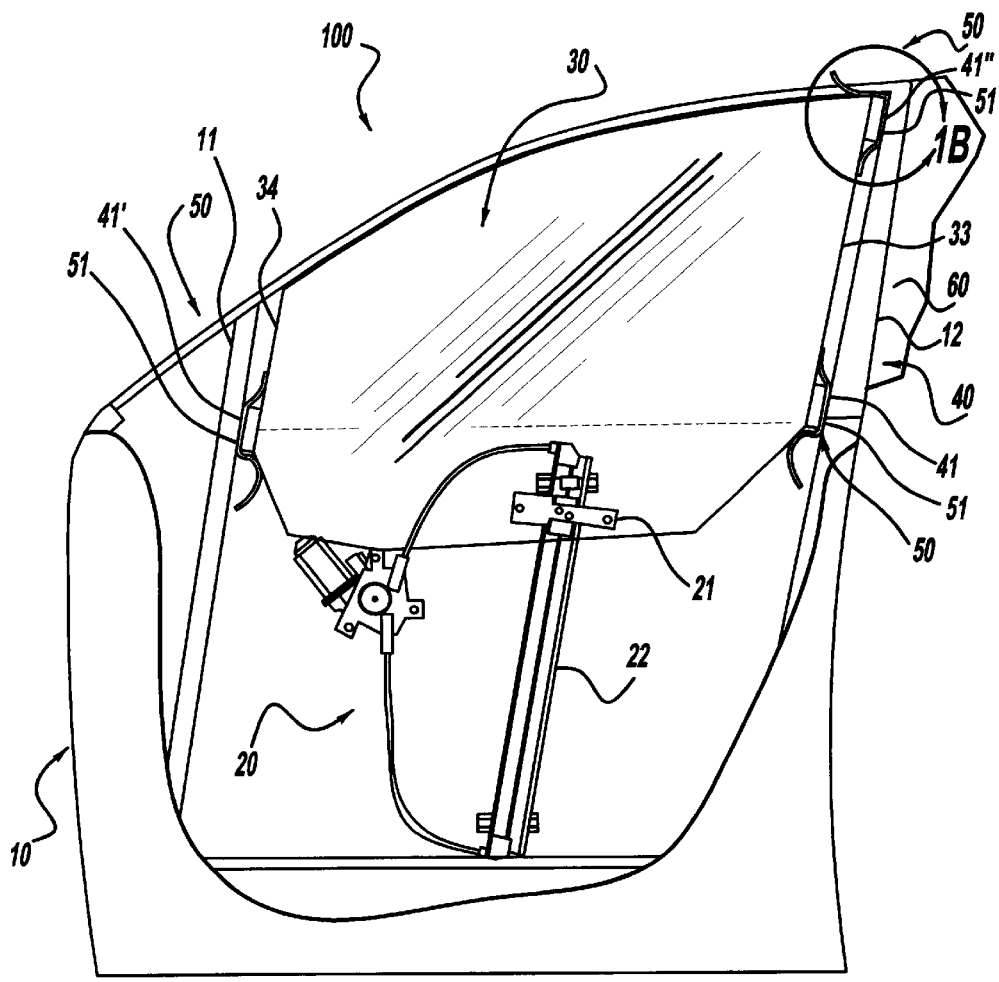
FIG. 1 is an elevational view of a vehicle door, partially cut away, revealing a sliding window alignment device in accordance with the preferred embodiment of the invention.

It should be understood that the appended drawings are not necessarily to scale, presenting a somewhat simplified representation of the various preferred features illustrative of the basic principles of the invention. The specific design features of the windowpanel alignment device as disclosed herein, including, for example, specific shapes of the locator member will be determined in part by the particular intended application and use environment. Certain features of the illustrated embodiments have been enlarged or distorted relative to others to facilitate visualization and clear understanding. In particular, thin features may be thickened, for clarity or illustration. All references to direction and position, unless otherwise indicated, refer to the orientation of the sliding window and locator member illustrated in the drawings. In general, up or upward refers to an upward direction in the plane of the paper and down or downward refers to a downward direction in the plane of the paper.

DETAILED DESCRIPTION OF CERTAIN PREFERRED EMBODIMENTS

It will be apparent to those skilled in the art, that is, to those who have knowledge or experience in this area of technology that many uses and design variations are possible for the window panel aligning devices disclosed herein. The following detailed discussion of various alternative and preferred features and embodiments will illustrate the general principles of the invention with reference principally to a sliding window for use in a motor vehicle. The embodiments are suitable for other applications, such as for example by way of non limiting examples, cars, trucks, vans, SUV's, golf carts, boats, trains, airplanes and other vehicular modes of transportation will be apparent to those skilled in the art given the benefit of this disclosure.

In keeping with traditional patent usage, the terms "a", "an", and "the" are used here to mean, and should be understood to mean "one or more" unless otherwise stated or a contrary meaning is made clear from the particular context. Thus, such terms include the singular and the plural.

It should be understood that directional terms used here refer to the direction shown in the drawings, unless otherwise is made clear from the particular context. Additionally, for the sake of clarity, some features in the drawings may be exaggerated and may not be to scale in comparison to other features.

Preferred embodiments of the assembly device disclosed here are operative to facilitate the installation of sliding windows in vehicles and the reduction in energy and reduction in noise in the operation of a sliding window. Further understanding of the principles of facilitating installation and energy management exemplified by the preferred embodiments of the aligning device disclosed here will be obtained from the discussion below with reference to the appended drawings.

The sliding windowpane alignment device according to the invention is designated by the numeral 100 and shown in FIGS. 1 through 9. FIG. 1 shows vehicle door 10, partially cut away, revealing window regulator assembly 20 and a window panel 30. A typical regulator is shown in U.S. Pat. No. 5,832,667 which disclosure is incorporated herein by reference. Regulator 20 has a drive means that includes motor affixed to an inner panel of the door, typically a permanent magnet dc motor, and a drive drum. Cables are attached to the drive drum at one end and glider at the other end. The glider is attached, optionally by snap fit to bracket 21, which in turn is bolted or riveted to window pane or panel 30. Alternative methods of attaching bracket 21 to window pane 30 can be used within the scope of the invention as well, such as by way of non-limiting example, such as bonding a glass attachment bracket to the lower edge of the windowpane and attaching the bracket with the glider to the glass attachment bracket. Those skilled in the art will also recognize the applicability of the present invention to manually operated sliding windowpanes.

The operation of the motor causes one cable to unwrap and one cable to wrap around drive drum and pulling on the glider that slides up and down along rail 22 so as to move windowpane 30 up and down along its travel path. A mounting assembly may, in certain embodiments include mounting brackets separately attached to holes in the door panel or a door securing the window regulator in holes in the door.

In front doors of motor vehicles with an A pillar, such as by way of non-limiting example, in a hardtop style, the windowpane 30 has edges or sides that slidably travel in adjacent run channels 11 and 12 from a full up position wherein windowpane 30 contacts header 14 in door 10 to a full down position in which the windowpane is positioned below beltline 15. Windowpane 30 has a surface 35 and a portion forming periphery 32 that conforms to opening 13 in door 10 defined by run channels 11 and 12 and header 14. Seals 16, 17 are positioned around or in the run channels to keep out the elements and to reduce wind noise. Alternatively, in vehicles without a header and an A pillar, such as by way of non-limiting example, a convertible, the operation is similar except that windowpane 30 has a side edge which slidably travels in one run channel, another side edge that is substantially a spaced apart vertical surface, and a periphery. The periphery conforms to an opening in door 10 and is defined by one run channel, a spaced apart substantially vertical surface and edge of door opening in body 60 that slidably travels from a full up position to a full down position as is well known in the art. Window panel 30 may be transparent, translucent or opaque.

Misalignment and stack-up tolerances may produce premature seal wear, slower cycle times or even jamming of the windowpane in the run channel. To address this problem, it has been found advantageous to use at least one locator member 40 to insure that the desired working clearance or gap is set between at least one of the side edges of windowpane 30 and its adjacent but corresponding run channel. After the desired gap is set between one of the side edges and the adjacent run channel, then the windowpane is locked in bracket 21 and the locating member is removed. With the locator member removed from the window, the windowpane operates in a conventional manner.

Locator member 40 may take any suitable shape to form a predetermined space or gap 38 between one or more of the side edges of windowpane and its adjacent and corresponding run channel as shown in FIGS. 1 and 2. Alternatively, locator member 40 forms a predetermined gap 38 between one of the side edges and the run channel in a convertible style vehicle.

Figure 1A:
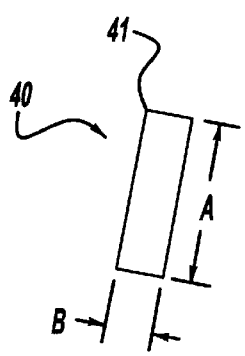
FIG. 1A is a side view of the locator block.
Figure 3:
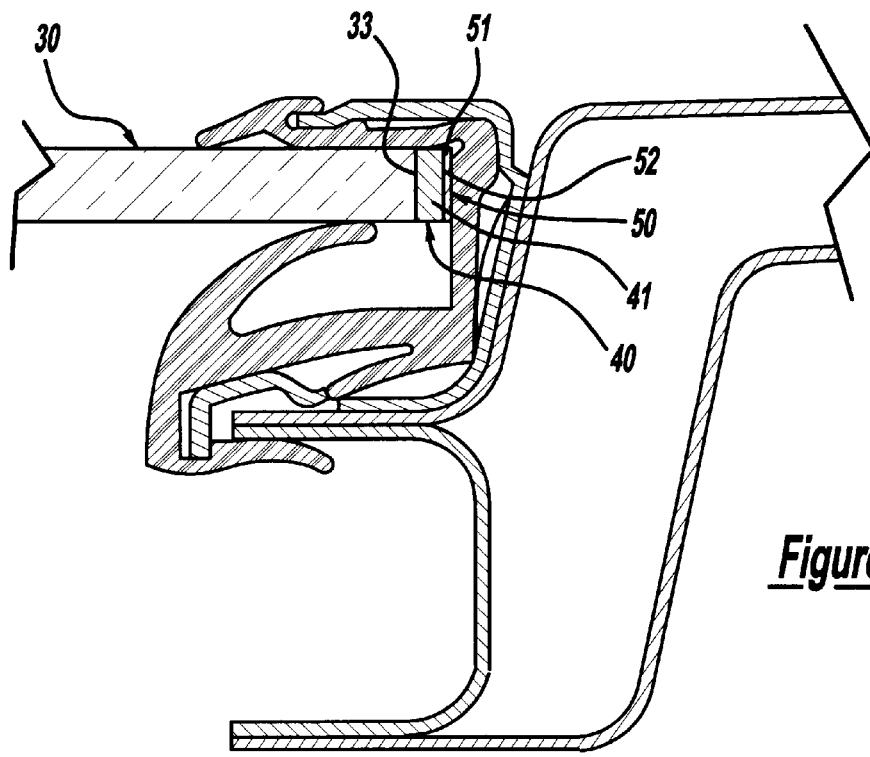
FIG. 3 is a partial top view of the locator block shown affixed to the run channel in the vehicle.

Locator member 40 may be made of any suitable material including wood, metal, paper and a polymeric material. The polymeric materials include a thermoplastic, such as Nylon, polypropylene, urethane; a plastomer; a thermoset plastic; or an elastomer. Alternately, any other material that is consistent with the teachings of this disclosure may be used. Locator member 40 includes block 41 with length A, width B, and thickness C (FIGS. 1A, and 1B). The width B is substantially the same as the thickness 36 of windowpane 30. Alternatively, locator member 40 may be in the shape of a cube with length A, width B, and thickness C, or a cross-sectional shape of a triangle, a truncated triangle, a cylinder, a truncated cylinder, a cone, a polygon, or any other suitable shape. By way of non-limiting example, length A is 35 MM, width B is 4 MM and thickness C is 1.5 MM where the desired working clearance between the edge of the windowpane and its corresponding seal is 1.5 MM. Those skilled in the art will recognize that the dimensions of member 40 can vary depending on the specific application requirements and maybe substantially larger or smaller than the example given in order to set the desired working clearance between the edge of the windowpane and the seal. If the desired working clearance between one edge of the windowpane and its corresponding seal is increased or decreased, then the thickness C of locator member 40 is adjusted appropriately. For example, it may be desired to have the gap between the edge and one run channel be 2.0 MM and the gap between the edge and the opposite side run channel be 1.0 MM.

Figure 8:
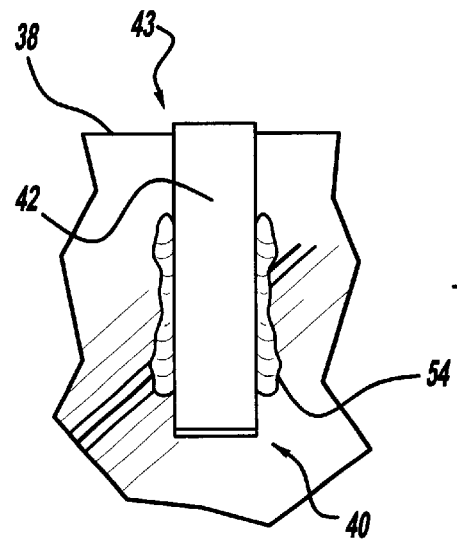
FIG. 8 is a side elevational view cut away of the another embodiment.

As stated earlier, affixation member 50 is optionally used to temporarily hold locator member 40 between at least one side edge of windowpane 30 and its adjacent and corresponding run channel. A suitable affixation member can take on many forms including, by way of non-limiting examples, removable adhesive tape 51 with one side having a single layer of adhesion material 52 or optionally with a double sided layer (FIGS. 1, 1B, 2, 2A, and 3); layer 53 of removable bonding agent or adhesive (FIGS. 3 and 4); and layer or bead of removable sealant 54 (FIG. 8). By way of non limiting examples, single sided layer 52 on tape 51 may be or alternatively, tape 51 may have adhesive layer 52 and 52' on both sides, such as for example, Acrylic Foam Tape 5344 or Acrylic Foam Tape 5345 made by 3M Automotive Division in St. Paul, Minn.; layer 53 may be formed by the application of adhesive, such as for example, Poster & Picture Stick by Elmer's Products, Inc. of Columbus, Ohio to windowpane 30 or locator member 40; and sealant 54 may include an elastomer base materials such as polyurethane, polysulfide and silicone or plastic base materials such as polyisobutylene or polybutadiene/acrylonitrile as is well known in the art. The affixation member can take on any other suitable form as long as it temporarily secures the locator block to one edge of the windowpane or optionally to the adjacent, corresponding run channel.

In the first embodiment of the invention (FIG. 1), with windowpane 30 temporarily locked to the regulator, the windowpane is moved in the run channel slid block 41 is located between side edge 33 of windowpane and its adjacent, corresponding run channel 12. Optionally, another locator block 41' is located between edge 34 of the windowpane and its adjacent, corresponding run channel 11. Further optionally, a still another locator block 41" is located a spaced away distance from either the one locator 41 or the another locator block 41' between the same edge of windowpane and the adjacent, corresponding run channel.

Tape 51 has body portion 55 that is temporarily applied or attached to the locator block and a pair of ends 56 which extend away from locator block 41. One of the ends 56 is affixed to side edge 33 or optionally to side edge 34 and the other of the pair of ends 56 is similarly applied to the corresponding same side edge (see FIGS. 1, 1B, 2, 2A and 3). Alternatively, body portion 55 is temporarily applied or attached to the locator block and each of the pair of ends 56 extends from locator block 41 such that one of the pair of ends 56 is affixed to one side of surface 35 and the other of the pair of ends 56 is affixed to the other side surface 35 of windowpane 30. Thus, member 50 wraps around a portion of the body of locator block 41 (see FIG. 6).

In operation, with block 41 held onto the edge of windowpanel 30 by affixation member 50, windowpane 30 is temporarily but firmly attached to bracket 21 of regulator 20 in a conventional manner. Then, windowpanel 30 and block 41 are moved to a full up position and inserted into the window opening 13 in door 10. Windowpanel 30 is positioned in such a manner that block 41 forms a substantially uniform gap between edge 33 and run channel 12 and alternatively between edge 34 and run channel 11. The windowpane is then locked to bracket 21 as is conventional and block 41 is removed by pulling one or both of the ends 56 from the edge of windowpane 30 or from one or the other surface 35. When one of the ends 56 is pulled away from the windowpane, the tape and block pull away from windowpane 30 and the block is removed from between the run channel and edge to form a substantially gap 38 between the edge of the window and its adjacent run channel. This permits the windowpane to function with a desired clearance between the regulator and windowpane and to permit normal energy efficient operation of the sliding window in a normal manner.

Figure 4:
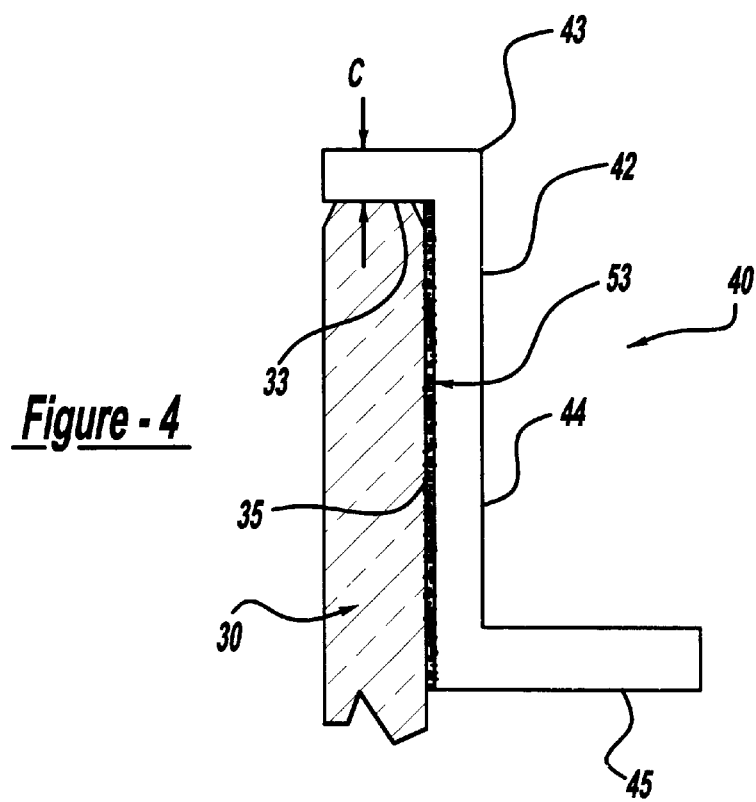
FIG. 4 is a partial blown up side sectional view of another embodiment of the invention.

In a second embodiment of the invention, as shown in FIGS. 4, 5 and 7) and where like elements are designated with the same indicia, locator member 40 includes a window surface spacer member 42. Spacer member 42 includes head portion 43, body portion 44 and optionally tab portion 45. Head portion 43 fits over the edge of the windowpane 30 and has thickness C to form a substantially uniform gap between the edge of windowpane and the run channel. Member 42 is temporarily affixed to the windowpane by adhesive tape 51 or alternatively by adhesive 53 or bead 54.

In operation, with spacer member 42 held onto windowpanel 30 by affixation member 50, windowpane 30 is temporarily but firmly attached to bracket 21 of regulator 20 in a conventional manner. Then, windowpanel 30 and spacer 42 are moved to a full up position and inserted into the window opening 13 in door 10. Windowpanel 30 is positioned in such a manner that spacer 42 forms a substantially uniform gap between edge 33 and run channel 12 and alternatively between edge 34 and run channel 11. The windowpane is then locked to bracket 21 as is conventional and spacer 42 is removed by pulling one or both of the ends 56 from the surface of windowpane 30 or from one or the other surface 35 or alternatively, the body portion or tab portion is pulled away from the edge or surface of windowpane to break the bond of affixation member so as to permit removal of spacer from the window. In all other aspects, this another embodiment operates as in the first embodiment, described above.

Figure 9:
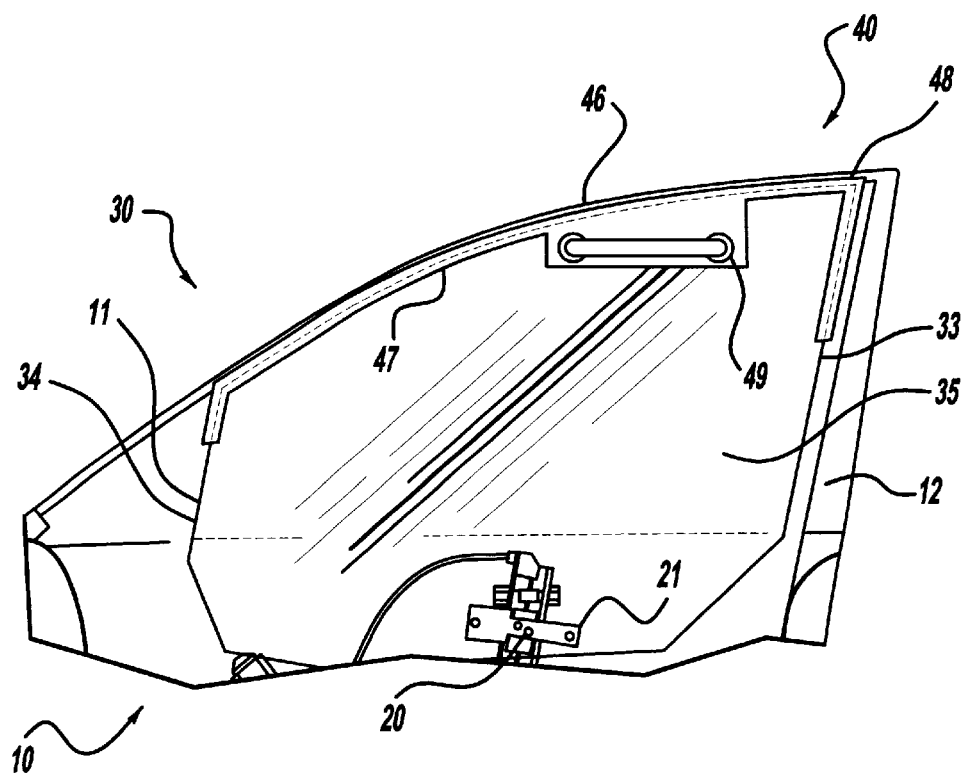
FIG. 9 is an elevational view of a vehicle door, partially cut away, showing yet still another embodiment of the invention.

In a third embodiment of the invention, as shown in FIG. 9, locator member 40 includes a template or fixture 46. Template has a longitudinally extending body 47, head portion 48 attached to the body and handle 49. Body 47 is made to conform to the peripheral edge of windowpane and head portion extends over the edge of the window panel with dimension C to form a substantially uniform gap between the edge 33 of the windowpane and run channel 12 and alternatively between edge 34 and run channel 11. The windowpane is then locked to bracket 21 as is conventional and template 46 is removed by pulling one or both of the ends 56 from the surface of windowpane 30 or from one or the other surface 35 or alternatively, when it is desired to remove spacer member from the window, the handle 49 is grasped so that body 47 and head portion 48 are pulled away from the edge or surface of windowpane. Alternatively, it may be desirable to use affixation member 50 to hold fixture 46 to the windowpane 30. When it is desired to break the bond of affixation member so as to facilitate removal of spacer from the window, the handle is grasped and the body is pulled away from the surface of windowpane 30. In all other aspects, this another embodiment operates as in the first and second embodiments, described above.

While it is apparent that the embodiments of the invention disclosed are well calculated to provide the advantages and features above stated, it will be appreciated that the invention is susceptible to modification, variation, and change without departing from the proper scope of fair meaning of the subjoined claims. For example, the device may be mounted to a wall or top panel in a vehicle instead of a door. The device may also be made in segments; that is, two or more locator blocks may be joined together by a bridge or two or more spacer members connected together by a web portion or slidably engaged. Other materials and dimensions can be substituted for those disclosed. Furthermore, the shapes of the locator members may be truncated, or extended. It is intended by the following claims to cover these and any other departures from the disclosed embodiments which, fall within the true spirit of this invention.

The invention as claimed is:

1. A window alignment device adapted for use in a vehicle, the vehicle having a portion forming a recess and a peripheral edge member, that alignment device comprising, in combination:
   a window panel having an outer periphery conforming to a portion of the shape of the peripheral edge member an edge;
   a locator member adjacent the outer periphery of the panel;
   an affixation member removably holding the locator member to on of the outer periphery and of the peripheral edge member, whereby when the window panel is affixed in the recess and the locator member is removed, a predetermined gap is formed between the edge of the window panel and the peripheral edge member.

2. The device of claim 1, wherein the affixation member is selected from the group consisting of an adhesive tape, an adhesive layer and an adhesive bead.

3. The device of claim 1, wherein the locator member having a shape selected from the group consisting of a rectangle, a cube, a triangle, a truncated triangle, a cylinder and a polygon.

4. The device of claim 1, wherein the vehicle having a door.

5. The device of claim 1, wherein the locator member is selected from a group consisting of a block, a spacer member and a fixture.

6. A vehicle window alignment device comprising, in combination:
   a vehicle having a body and a door, the door including a portion forming a peripheral edge member;
   a window panel having an outer periphery conforming to a portion of the shape of the peripheral edge member;
   a window panel having an outer periphery conforming to a portion of the shape of the peripheral edge member;
   at least one locator member adjacent to the outer periphery of the window panel; and
   an affixation member temporarily holding the locator member to one of the outer periphery and the peripheral edge member;
   whereby when the window panel is disposed in one of the door and of the body, the locator member is adjacent to the peripheral edge member to locate the panel relative to the peripheral edge member so that when the locator member is removed a predetermined gap is formed between the window panel and the peripheral edge.

7. The device of claim 6, wherein the predetermined gap is less then 1.5 mm.

8. The device of claim 6, wherein the window panel is slidably mounted in the door.

9. The device of claim 6, wherein the locator member is blocked having a cross sectional shape selected from the group consisting of a rectangle, a square, a triangle, a cylinder, and a polygon.

10. The device of claim 6, wherein the locator member having a head potion, a body potion and a tab portion.

11. The device of claim 6, wherein the locator member is a fixture, the fixture having a head portion and a body.

12. The device of claim 6, wherein the affixation member is an adhesive tape, the tape having a body and a pair of ends, the body adjacent the locator member and each of the pair of ends on one of the peripheral edge and of the surface of the window panel.

13. A vehicle window alignment device adapted for use in a door having a peripheral edge, a recess, and a window regulator, the device comprising, in combination:
   a window panel adjacent to the window regulator, the panel having a peripheral edge a portion adapted to conform to a portion of the shape of the door disposed in the recess of the door;
   a locator member adjacent to the window regulator, the panel having a peripheral edge, the locator member being disposed between the door and the window panel, whereby when the window panel is fastened to die regulator, the locator member is removed to form a predetermined gap between the panel and the door; and
   an affixation member removably attaching the locator member to the window panel.

14. The device of claim 13, wherein the locator member having a head portion with a thickness of less than 2.0 mm.

15. The device of claim 13, wherein the affixation member is selected from the group consisting of an adhesive tape, adhesive layer and an adhesive bead.

16. The device of claim 13, wherein the locator member is selected from the group consisting of a block, a spacer member and fixture.

17. A method of assembling a window panel to a vehicle, the vehicle having a body and door including a portion forming a peripheral edge member, the method comprising the steps of:
   a locator member on the window panel;
   sliding the window panel between the peripheral edge member and the run channel;
   removing the locator member form the windowpane to form a predetermined gap between window panel and one of the door and of the body and
   temporarily bonding the locator member to the windowpane.

18. The method of claim 17, wherein the locator member is selected form the group consisting of a block, spacer and a template.

19. The method of claim 17, further comprising:
   fixing the window panel to the door.

20. The method of claim 17, wherein the bonding step includes application of one of an adhesive tape, of an adhesive layer and of a bead of sealant.

* * * * *